(12) United States Patent
Wang et al.

(10) Patent No.: US 7,986,685 B2
(45) Date of Patent: Jul. 26, 2011

(54) REAL-TIME XML MESSAGING PROTOCOL

(75) Inventors: Phil Wang, Nepean (CA); Abdulkader Omar Barbir, Chelsea (CA)

(73) Assignee: Avaya Inc., Basking Ridge, NJ (US)

( * ) Notice: Subject to any disclaimer, the term of this patent is extended or adjusted under 35 U.S.C. 154(b) by 1657 days.

(21) Appl. No.: 11/268,909

(22) Filed: Nov. 8, 2005

(65) Prior Publication Data

US 2007/0124725 A1      May 31, 2007

(51) Int. Cl.
  *H04L 12/66* (2006.01)
(52) U.S. Cl. .............. 370/354; 379/88.17; 709/242; 715/237
(58) Field of Classification Search ........... 370/352–356
  See application file for complete search history.

(56) References Cited

U.S. PATENT DOCUMENTS

| | | | |
|---|---|---|---|
| 6,907,455 B1 * | 6/2005 | Wolfe et al. .............. 709/217 |
| 6,941,310 B2 * | 9/2005 | Ahad et al. .............. 1/1 |
| 6,954,432 B1 * | 10/2005 | Bychowsky et al. ......... 370/236 |
| 7,046,691 B1 * | 5/2006 | Kadyk et al. .............. 370/466 |
| 7,065,706 B1 * | 6/2006 | Sankar .............. 715/234 |
| 7,139,809 B2 * | 11/2006 | Husain et al. .............. 709/213 |
| 7,194,529 B2 * | 3/2007 | Kupiec et al. .............. 709/223 |
| 7,319,696 B2 * | 1/2008 | Inoue et al. .............. 370/392 |
| 7,356,616 B2 * | 4/2008 | Kaler et al. .............. 709/246 |
| 7,392,226 B1 * | 6/2008 | Sasaki et al. .............. 705/64 |
| 7,409,400 B2 * | 8/2008 | Ramarao .............. 707/101 |
| 7,466,680 B2 * | 12/2008 | Grech .............. 370/338 |
| 7,522,552 B2 * | 4/2009 | Fein et al. .............. 370/328 |
| 7,603,476 B1 * | 10/2009 | Hofmann et al. .............. 709/237 |
| 2002/0169707 A1 | 11/2002 | Koek et al. |
| 2004/0172300 A1 | 9/2004 | Mihai et al. |
| 2005/0022162 A1 | 1/2005 | Moreau et al. |

OTHER PUBLICATIONS

International Search Report, International Appl. No. PCT/US06/60214, dated Oct. 18, 2007, 2 pages.

* cited by examiner

*Primary Examiner* — Simon Sing
(74) *Attorney, Agent, or Firm* — Maldjian Law Group LLC; John P. Maldjian, Esq.

(57) ABSTRACT

Described are a method and a system for using XML in a real-time message for transmission of data from a source to a destination over a network. The real-time XML message includes a header element and a body element. The header element includes one or more destination elements and one source element, each having a unique identifier and a set of pre-defined and user-defined real-time properties. The body element of the message includes the data to be carried to the destination in plain or encoded XML content. XML addresses are proposed as the identifier of the source and destination, and an XML naming service can look up an XML address from the canonical name of the source and destination. Advantageously, the real-time message can be transported through the network using XML addresses included in the destination and source elements of the message.

27 Claims, 3 Drawing Sheets

```
<?xml version="1.0" encoding="UTF-8"?>
<!-- a real-time XML message sample -->

<rtxml:message version="1.0"
    targetNamespace="http://rtxml.org"
    xmlns="http://rtxml.org"
    xmlns:rtxml="http://rtxml.org"
    xsi:schemaLocation="
        http://rtxml.org/rtxml.xsd
        rtxml.xsd">

<!-- message header: real-time properties -->
<rtxml:header>
    <!-- general -->
    <title>Title</title>
    <!-- recipient 1 -->
    <destination>
        <!-- the unique identifier of a recipient or group: name, ID, XML address -->
        <identifier>http://www.rtxml-dest.com/rtx/dest1</identifier>
        <!-- 12345678 is the serial number of last received message -->
        <serialNumber>12345678</serialNumber>
        <!-- 12 is the delay in milliseconds receiving last message -->
        <timeDelay>12</timeDelay>
        <!-- OK is the status in receiving and processing last message -->
        <status>OK</status>
    </destination>
    <!-- recipient 2 -->
    <destination>
        <!-- the unique identifier of a recipient or group: name, ID, XML address -->
        <identifier>http://www.rtxml-dest.com/rtx/dest2</identifier>
        <!-- 31234567 is the serial number of last received message -->
        <serialNumber>31234567</serialNumber>
        <!-- 10 is the time delay in milliseconds receiving last message -->
        <timeDelay>10</timeDelay>
        <!-- OK is the status in receiving and processing last message -->
        <status>OK</status>
    </destination>
```

FIG. 2A

```
<!-- sender -->
<source>
    <!-- the sedner's unique identifier such as name, ID or XML address -->
    <identifier>http://www.rtxml-source.com/rtx/source</identifier>
    <!-- 23456789 is the serial number of this message -->
    <serialNumber>23456789</serialNumber>
    <!-- 2005-05-20T11:22:33.123-05:00 is the time generating this message -->
    <timeStamp>2005-05-20T11:22:33.123-05:00</timeStamp>
    <!-- 15 is the allowed time delay in milliseconds when this message expires -->
    <timeExpiry>15</timeExpiry>
    <!-- high: indicates the message priority is high -->
    <priorityType>high</priorityType>
    <!-- normal indicates the message body is normal (of XML text) -->
    <bodyType>normal</bodyType>
    <!-- true if a receipient needs to ack when this message arrives -->
    <ackFlag>true</ackFlag>
    <!-- 45 is the allowed time delay in milliseconds when the send receives an ack -->
    <ackTime>45</ackTime>
</source>
...
</rtxml:header>

<!-- message body: plain or binary XML content -->
<rtxml:body coding="none">
    [XML text]
</rtxml:body>
...
</rtxml:message>
```

FIG. 2B

REAL-TIME XML MESSAGING PROTOCOL

FIELD OF THE INVENTION

The invention relates generally to XML messaging. More particularly, the invention relates to a method for generating XML messages for real-time communications and XML routing for transporting real-time XML messages.

BACKGROUND OF THE INVENTION eXensible Markup Language (XML) is a popular metalanguage used to define other languages of data exchange and business communications. XML describes data and messages using easily understood tags. Thus XML is increasingly used in a number of business services and applications, including mission-critical financial transactions and real-time medical processing. Such critical business applications often require rapid responses through real-time communications of various messages, and now XML messages.

Simple Object Access Protocol (SOAP) is a common messaging protocol that communicates XML messages among applications using HyperText Transfer Protocol (HTTP). SOAP is a platform independent messaging protocol that provides an "envelope" containing a message header and a message body. The message header can accommodate customized messaging properties such as time and data formats. However, there is no standard mechanism in SOAP to define real-time XML messages.

fisdMessage protocol is an industry standard intended for the exchange of data between financial entities such as brokerage firms and banks. In the financial industry, Market Data Definition Language (MDDL) is the common XML derivative employed in data transfer. fisdMessage supports binary encoded XML content with a standards-based real-time streaming data feed. Current fisdMessage encodes an XML message only with a timestamp but other critical parameters for real-time messaging such as identifier, expiry, priority and acknowledgement are absent.

A number of XML hardware devices are available for fast XML routing, parsing and processing. Some versions of XML accelerators improve XML parsing through hardware processing of XML documents, XML schemas and XPath queries. Some XML routers speed up XML message forwarding through hardware support of SOAP and XPath. The hardware accelerations speed up processing of those XML protocols but do not support the real-time nature of XML messaging and routing.

What are needed are a method and a system to provide real-time XML messaging over a communication network. The present invention satisfies this need and provides additional advantages.

SUMMARY OF THE INVENTION

In one aspect, the invention features a method for generating a real-time XML message for transmission of data from a source to at least one destination over a network. A header element and a body element are generated. The header element includes at least one destination element and a source element each having at least one real-time validation element expressing a real-time property of the real-time XML message. The body element includes the data to be transmitted.

In another aspect, the invention features a system for transmitting a real-time XML message through a network. The system includes an XML router configured to receive the real-time XML message, to determine a destination from an XML address associated with a destination element of the real-time XML message, and to forward the real-time XML message through another communications link in the network in response to the determined destination.

In still another aspect, the invention features a method for using XML in a real-time message for transmission of data from a source to at least one destination over a communication network. A header element and a body element are generated. The header element includes at least one destination element having a unique destination identifier comprising an XML address associated with the respective at least one destination. The header element also includes a source element having a unique source identifier comprising an XML address associated with the source. The body element includes the data to be transmitted.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

FIGS. 2A and 2B illustrate an example of an XML message based on an embodiment of the real-time XML messaging protocol according to the invention.

DETAILED DESCRIPTION

Real-time XML messaging requires the development of real-time capability through XML coding, routing, transport, parsing and processing. Moreover, it also requires a real-time communication protocol of XML, and particularly on a message format acceptable between peers. In brief overview, the invention relates to a method for generating a real-time XML (RTXML) message for transmission of data from a source (i.e., sender) to at least one destination (i.e., recipient) over a communication network. A header element and a body element are generated in the form of XML. The header element includes a destination element and a source element each having at least one real-time validation element that expresses a real-time property of the RTXML message. The body element includes the data to be transmitted. The invention also relates to a method and system for using an XML address in an RTXML message to perform real-time routing of the message through a network.

Figure 1:
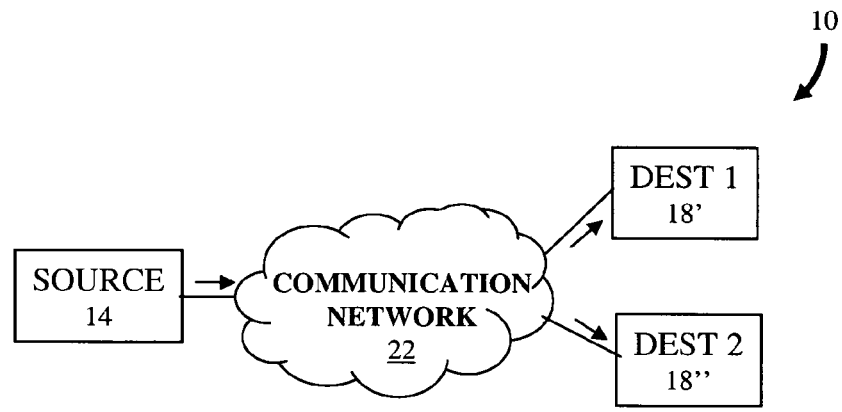
FIG. 1 illustrates a network environment in which the method of the invention can be practiced.

FIG. 1 illustrates a network environment 10 in which the method of the invention can be practiced. The network environment 10 can be an existing communication network such as the Internet, and includes a source 14 in communication with destinations (i.e., recipients) 18' and 18"(generally 18) through a communication network 22. An RTXML messaging protocol in accordance with the invention includes a messaging vehicle and a message format. RTXML is a platform-independent protocol and therefore does not rely on a particular software, hardware or means of network communications for implementation. Thus the messaging vehicle for RTXML can be any existing communication mechanism and protocol supported by the communication network 22. For example, an RTXML message can be carried in an IP packet payload (e.g. TCP, UDP), a HyperText Transfer Protocol (HTTP) document, or a Simple Object Access Protocol (SOAP) envelope. Furthermore, the secure transport of an RTXML message can be realized through a number of security enhancements such as XML security (encryption and digital signature), IPSEC and HTTPS.

The message format for the RTXML messaging protocol is defined herein as the expression of the XML message and feedback for real-time communication. Messaging peers accepting the message easily understand the real-time XML message.

FIGS. 2A and 2B illustrate an example of an XML message 26 based on an embodiment of the RTXML messaging protocol of the invention. RTXML describes the message format in terms of an XML schema. The schema provides for definition of the RTXML message version, XML namespace information and all the XML elements to constitute a real-time message. The XML message 26 includes a message element 30, a top element 32, a header element 34 and a body element 38. The top element 32, header element 34 and body element 38 are children of the message element 30.

The top element 32 starts the message with a number of XML attributes such as the RTXML version, target XML namespaces and XML schema location. Those XML attributes are used to parse and process the RTXML message.

The RTXML message header element 34 includes the real-time attributes of the XML message 26, including one or more real-time validation elements. As used herein, a real-time validation element means an attribute or element in the header element 34 that has a time or status value used to enable real-time behavior and ensure data validity. The RTXML message body 38 includes the XML content that is to be transmitted to a destination 18.

The header element 34 includes an element <title> 42 which is a general property of the RTXML message 26 that indicates a subject or reference for a real-time communications session that the source 14 and the one or more destinations 18 can share. The header element 34 may include other general properties of the RTXML message 26.

A destination portion 44 of the RTXML message header element 34 includes one or more destination elements 46' and 46" (generally 46). In FIG. 2, the destination elements 46 contain information about two recipients such as the destination's identification <identifier>, the serial number of the destination's last message <serialNumber>, the time delay <timeDelay> and the status <status> of the last message. The identification can specify an individual or a group in which the individual is a member. An individual can be represented by a computer or a network node, a user of the network node, an application of the user, or the like. The time delay is the difference between the received time and the timestamp of the last message. The status is an acknowledgement to a received message and can include an enumeration of values such as OK, expired, badHeader and badMessage. If the message 26 is to be replied to more than one destination 18, the header element 34 can include a destination element 46 for each destination 18. However, each destination element 46 may include other elements that are defined and will be defined by the RTXML protocol and user extensions.

The source portion of an RTXML message header element 34 includes one XML element <source> 50 that has the source's identification <identifier>, serial number <serialNumber> and timestamp <timestamp> for the message 26 as assigned by the source 14, and the period of time <timeExpiry> during which the message 26 is valid (i.e., the time until the message 26 expires). If the destination 18 receives an expired message, a request can be sent to the source 14 for an updated message. An optional priority designation <priorityType> can be included in the element <source> 50 to indicate the forwarding priority (e.g., high, normal, low) of the message 26.

The element <source> 50 also includes the type of the message body <bodyType>, an acknowledgement flag <ackFlag> and an acknowledgement time <ackTime>. The body type <bodyType> for the message 26 can be assigned different values such as normal for XML text or another value to indicate enhanced XML content (e.g., encrypted content, digitally signed content). The acknowledgement flag <ackFlag> indicates whether the destination 18 should return an acknowledgement upon receipt of the message 26. The acknowledgement time <ackTime> indicates how long the source 14 allocates for receiving an acknowledgement of its message when the acknowledgement flag is set to true. If the source 14 included an acknowledge flag <ackFlag> but no acknowledgement was received within a predetermined time, the source 14 sends a new message to the destination 18 which can include updated XML content, if appropriate. The element <source> 50 can include other elements that are defined and will be defined by the RTXML protocol and customer extensions.

The XML content of the body element 38 can be plain XML text or binary XML data, as specified by the XML element <BodyType> in the source element 50 of the RTXML header 34. If the XML content is binary, the method or algorithm to extract the binary data is specified by the attribute "coding" of the body element 38. The body element 38 may include other attributes as to represent the attributes of the message body.

Real-time communications require that delay due to transmission of messages between a source 14 and a destination 18 be sufficiently small so that the message information is still valid. For example, financial market data can change significantly over brief periods of time thus "old data" can have no value to a destination. RTXML provides four time elements <timeStamp>, <timeDelay>, <timeExpiry> and <ackTime>, each accurate to a small portion of the acceptable limits for the corresponding elements (e.g., one millisecond accuracy). As illustrated, the element <timeStamp> is 2005-05-20T11:23:33.123-5:00, representing a time 123 milliseconds after 11:23:33 AM eastern daylight time (EDT) on May 20, 2005, when the message 26 was generated.

Figure 3:
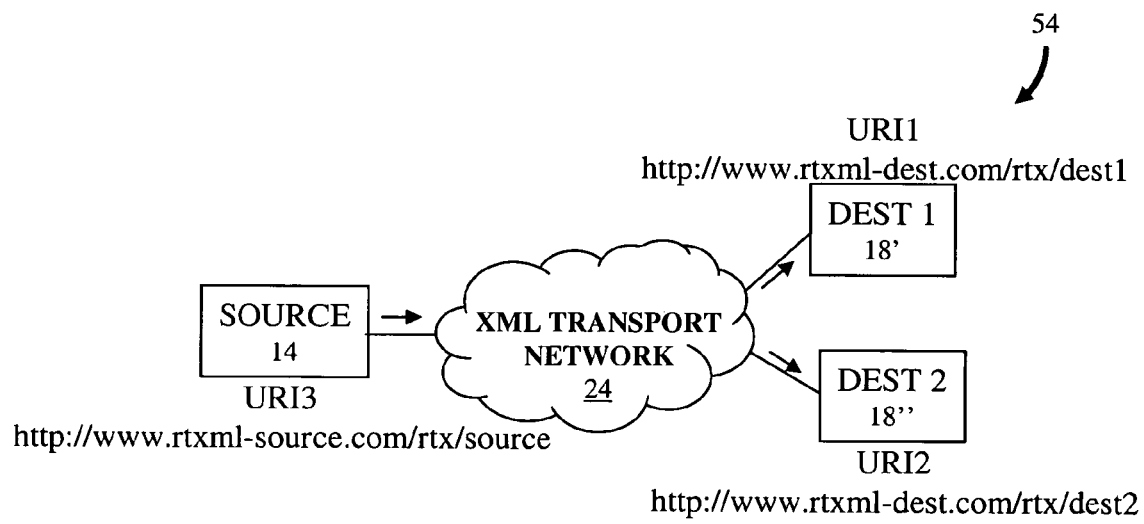
FIG. 3 illustrates an example of a network environment utilizing XML address-based transport of real-time messages as an alternative to the legacy communication network of FIG. 1.

The RTXML message 26 uses unique identifiers for the source 14 and for each destination 18. The unique identifiers can be expressed as the XML addresses of the source 14 and the destinations 18 of an RTXML message. Generally, an XML address can be assigned according to a predetermined addressing scheme or a uniform resource identifier (URI). For example, in FIG. 3, the XML address of the source 14 is a URI "http://www.rtxml-source.com/rtx/source". The URI of an XML address may include a prefix (e.g., "http://"), and the unique information of a particular node (i.e., "www.rtxml-source.com"), a particular user of a node (e.g. "rtx"), a particular application of a user (e.g., "source"), and other components such as a particular communication channel of an application.

For convenience, a source or destination identifier of the RTXML message 26 can be a canonical name or an alias, and its XML address can be looked up from a naming service which is the XML naming service. The XML naming service maps a source or destination name to its corresponding XML address(es) using a database of names and addresses. Identification of sources and destinations according to unique XML addresses can accelerate XML messaging sessions when XML routing is utilized. XML routers can be used to transport real-time messages, replacing legacy network nodes such as IP (the Internet Protocol) routers. In particular, routing tables based on XML addresses can be used to achieve wire-speed routing through hardware acceleration. In addition, the priority designation of an XML message can used to determine its forwarding priority during routing.

Referring again to FIG. 3, an example of a network environment 54 utilizing XML-address-based transport, as an alternative to the conventional communication network 22 of FIG. 1 is shown. An XML transport network 24 forwards and routes data using XML addresses replacing legacy addresses such as IP addresses in the communication network 22. A number of XML routers form the local or global network 24 transporting data between wide-spread source and destination nodes 14, 18. The source and destinations 14, 18 each have a unique XML address and all the data are fast forwarded or routed according to the source and destination XML addresses.

The message 26 includes the XML destination address for each destination 18. In the illustrated example, the XML address for destination DEST 1 18' is URI1 which is http://www.rtxml-dest.com/rtx/dest1, and the XML address for destination DEST 2 18" is URI2 which is http://www.rtxml-dest.com/rtx/dest2. The source 14 provides its XML address URI3 (http://www.rtxml-source.com/rtx/source) which is used by the two destinations 18 for acknowledgements and reply messages.

The rapid development of web services and applications has made SOAP a dominant protocol for XML messaging. To accommodate for XML flexibility, SOAP can be used as a protocol framework. Similar to the RTXML message 26, SOAP provides for an envelope having two major XML elements: header and body. The SOAP header has the flexibility to introduce new XML protocols such as RTXML and the RTXML header is sufficiently flexible to integrate with SOAP. Binding RTXML with SOAP is accomplished by combining their headers and bodies. Thus, the SOAP header adopts the real-time properties of the RTXML schema and the SOAP body includes the real-time content of the message 26.

While the invention has been shown and described with reference to specific embodiments, it should be understood by those skilled in the art that various changes in form and detail may be made therein without departing from the spirit and scope of the invention.

What is claimed is:

1. A system for transmitting a real-time XML message from a source to at least one destination through a network, the real-time XML message having at least one real-time validation element expressing a real-time property of the real-time XML message, the system comprising an XML router configured to:
   receive the real-time XML message through a first communications link in the network;
   send to the source, responsive to the at least one real-time validation element indicating data within the real-time XML message is invalid, a request for an update to the real-time XML message; and
   determine, responsive to the at least one real-time validation element indicating data within the real-time XML message is not invalid, the at least one destination from an XML address associated with a destination element of the real-time XML message; and;
   forward the real-time XML message through a second communications link in the network in response thereto.

2. The system of claim 1, further comprising at least one other XML router, wherein the XML router is configured to: (i) send, to the at least one other XML router through the first communication link, the request for an update to the real-time XML message, and (ii) forward the real-time XML message to the at least one other XML router through the second communication link.

3. The system of claim 1, wherein the XML router is configured to forward the real-time XML message to the destination through the second communications link.

4. The system of claim 1, wherein each of the source and at least one destination are indicated by a respective unique destination identifiers.

5. The system of claim 4, wherein each of the unique destination identifiers comprises an XML address.

6. The system of claim 4, wherein each of the unique destination identifiers comprises a canonical name for determining an XML address by a naming service.

7. The system of claim 1, further comprising at least one other XML router, wherein the XML router is configured to forward the real-time XML message to the at least one other XML router through the second communications link.

8. The system of claim 1, wherein the XML router is configured to forward the real-time XML message to the destination through the second communications link.

9. The system of claim 1, further comprising the source, wherein the source is configured to: communicatively couple with the XML router through at least one communication link in the network, and generate and forward toward the XML router any of the real-time XML message and an update to the real-time XML message.

10. The system of claim 1, further comprising the at least one destination, wherein the at least one destination is configured to: communicatively couple with the XML router through at least one communication link in the network, receive the real-time XML message, and send to the source, responsive to the at least one real-time validation element indicating data within the real-time XML message is invalid, a request for an update to the real-time XML message.

11. A source node configured for transmission of real-time data to at least one destination node over a network, the source node comprising:
   a memory for storing data for transmission to the at least one destination node, the memory comprising a data structure including information for forwarding a real-time XML message including:
   a header element comprising at least one destination element and a source element, wherein each of the at least one destination and source elements comprise at least one real-time validation element expressing a real-time property of the real-time XML message; and
   a body element comprising the data to be transmitted to the at least one destination node, wherein:
      the source node is further configured to receive, from any of the at least one destination node and a node of the network communicatively coupled intermediate to the source and the at least one destination nodes, if any, a request for an update to the real-time XML message; and
      the request is responsive to the at least one real-time validation element indicating the real-time data within the real-time XML message is invalid.

12. The source node of claim 11, wherein the at least one real-time validation element of the at least one destination element comprises a status acknowledgment of a prior real-time XML message sent by the at least one destination node and received by the source node.

13. The source node of claim 11, wherein the at least one real-time validation element of the at least one destination element comprises a time delay indicating the difference between a received time of a prior real-time XML message and a timestamp in the prior real-time XML message.

14. The source node of claim 11, wherein the at least one real-time validation element of the source element comprises a time until the data in the real-time XML message expires.

15. The source node of claim 11, wherein the at least one real-time validation element of the source element comprises an acknowledgement flag to indicate whether the at least one destination node should return an acknowledgement upon receipt of the real-time XML message.

16. The source node of claim 11, wherein the at least one real-time validation element of the source element comprises an acknowledgement time to indicate a duration allocated by the source node for receiving a message acknowledgement from the at least one destination node.

17. The source node of claim 11, wherein the source node is further configured to transmit the header and body elements in an Internet Protocol (IP) packet.

18. The source node of claim 11, wherein the source node is further configured to transmit the header and body elements in a HyperText Transfer Protocol (HTTP) document.

19. The source node of claim 11, wherein the data structure of the memory of the source node comprises a Simple Object Access Protocol (SOAP) envelope, and wherein the SOAP envelope comprises the header and body elements.

20. A source node configured for transmission of real-time data to at least one destination node over a network, the source node comprising:
    a memory for storing data for transmission to the at least one destination node, the memory comprising a data structure including information for forwarding a real-time XML message including:
    a header element comprising: (i) at least one destination element having a unique destination identifier comprising an XML address associated with a respective one of the at least one destination node, and (ii) a source element having a unique source identifier comprising an XML address associated with the source node, wherein each of the at least one destination and source elements comprises at least one real-time validation element expressing a real-time property of the real-time XML message; and
    a body element comprising the real-time data to be transmitted to the at least one destination node, wherein:
        the source node is further configured to receive, from any of the at least one destination node and a node of the network communicatively coupled intermediate to the source and the at least one destination nodes, if any, a request for an update to the real-time XML message; and
        the request is responsive to the at least one real-time validation element indicating the real-time data within the real-time XML message is invalid.

21. The source node of claim 20, wherein the unique destination identifier comprises a name that can be matched to the XML address associated with the at least one destination node by a naming service.

22. The source node of claim 20, wherein the unique source identifier comprises a canonical name that can be matched to the XML address associated with the source node by a naming service.

23. The source node of claim 20, wherein the source element comprises a priority designation to indicate a forwarding priority of the real-time XML message.

24. The source node of claim 20, wherein at least one of the XML addresses comprises a uniform resource identifier.

25. The source node of claim 20, wherein the source node is further configured to transmit the header and body elements in an Internet Protocol (IP) packet.

26. The source node of claim 20, wherein the source node is further configured to transmit the header and body elements in a HyperText Transfer Protocol (HTTP) document.

27. The source node of claim 20, wherein the data structure of the memory of the source node comprises a Simple Object Access Protocol (SOAP) envelope, and wherein the SOAP envelope comprises the header and body elements.

* * * * *